US011260937B2

(12) United States Patent
Reinbold et al.

(10) Patent No.: US 11,260,937 B2
(45) Date of Patent: Mar. 1, 2022

(54) MULTI SPROCKET ARRANGEMENT WITH WELD CONNECTION

(71) Applicant: SRAM DEUTSCHLAND GmbH, Schweinfurt (DE)

(72) Inventors: Matthias Reinbold, Wuerzburg (DE); Hong-Chou Lee, New Taipei (TW)

(73) Assignee: SRAM Deutschland GmbH, Schweinfurt (DE)

( * ) Notice: Subject to any disclaimer, the term of this patent is extended or adjusted under 35 U.S.C. 154(b) by 568 days.

(21) Appl. No.: 15/885,179

(22) Filed: Jan. 31, 2018

(65) Prior Publication Data
US 2018/0215444 A1    Aug. 2, 2018

(30) Foreign Application Priority Data

Jan. 31, 2017   (DE) ................... 10 2017 000 855.8

(51) Int. Cl.
| | |
|---|---|
| *B62M 9/10* | (2006.01) |
| *B62M 9/12* | (2006.01) |
| *B62M 9/04* | (2006.01) |
| *B29C 65/16* | (2006.01) |
| *B23K 20/12* | (2006.01) |
| *B60B 27/02* | (2006.01) |

(52) U.S. Cl.
CPC .......... *B62M 9/10* (2013.01); *B29C 65/1632* (2013.01); *B62M 9/04* (2013.01); *B62M 9/105* (2013.01); *B62M 9/12* (2013.01); *B23K 20/12* (2013.01); *B60B 27/023* (2013.01)

(58) Field of Classification Search
CPC .......... B62M 9/10; B62M 9/105; B62M 9/12; F16H 55/30; B29C 65/1632; B60B 27/023
USPC .......................................................... 474/160
See application file for complete search history.

(56) References Cited

U.S. PATENT DOCUMENTS

| | | | | | |
|---|---|---|---|---|---|
| 3,835,729 | A | * | 9/1974 | Tarutani ................. | F16P 1/04 474/144 |
| 4,380,445 | A | * | 4/1983 | Shimano ................ | B62M 9/105 474/144 |
| 5,480,359 | A | * | 1/1996 | Tani ....................... | B62M 9/105 474/160 |
| 8,360,911 | B2 | * | 1/2013 | Braedt .................... | B62M 9/10 474/164 |
| 9,168,976 | B1 | * | 10/2015 | Earle ...................... | B21D 53/86 |
| 9,308,967 | B2 | * | 4/2016 | Braedt ................... | F16H 55/303 |

(Continued)

FOREIGN PATENT DOCUMENTS

| | | |
|---|---|---|
| DE | 2535943 A1 | 3/1976 |
| DE | 8215042 U1 | 2/1983 |

(Continued)

*Primary Examiner* — Michael R Mansen
*Assistant Examiner* — Raveen J Dias

(57) ABSTRACT

A multi sprocket arrangement is configured for mounting on a driver of a bicycle wheel. The multi sprocket arrangement includes a plurality of adjacent sprockets each of the plurality of sprockets having a different number of teeth. The plurality of adjacent sprockets include a first sprocket having a first inner diameter which is larger than an outer diameter of a profile base of a carrier profile of the driver, and a second sprocket having a second inner diameter which is smaller than the outer diameter of the profile base of the carrier profile of the driver. The first sprocket and the second sprocket are connected together by welding.

6 Claims, 20 Drawing Sheets

(56) References Cited

U.S. PATENT DOCUMENTS

| | | | |
|---|---|---|---|
| 2011/0105263 A1* | 5/2011 | Braedt | B62M 9/10 474/160 |
| 2013/0017914 A1* | 1/2013 | Braedt | B62M 9/10 474/160 |
| 2015/0024884 A1 | 1/2015 | Braedt et al. | |
| 2016/0272002 A1 | 9/2016 | Earle et al. | |
| 2017/0043840 A1* | 2/2017 | Reinbold | F16H 55/30 |
| 2018/0105229 A1* | 4/2018 | Reinbold | B62M 9/122 |
| 2019/0054765 A1* | 2/2019 | Thrash | B60B 27/04 |
| 2019/0113123 A1* | 4/2019 | Civiero | F16H 57/0025 |

FOREIGN PATENT DOCUMENTS

| | | | | |
|---|---|---|---|---|
| DE | 3623067 A1 | 1/1987 | | |
| DE | 3725836 A1 | 2/1988 | | |
| DE | 102009006101 A1 | 7/2009 | | |
| DE | 102013012066 | 7/2013 | | |
| DE | 202015005643 U1 * | 11/2015 | | B62M 9/10 |
| EP | 2093139 B1 | 9/2012 | | |
| EP | 2826701 A1 | 1/2015 | | |
| GB | 2177628 A | 1/1987 | | |

\* cited by examiner

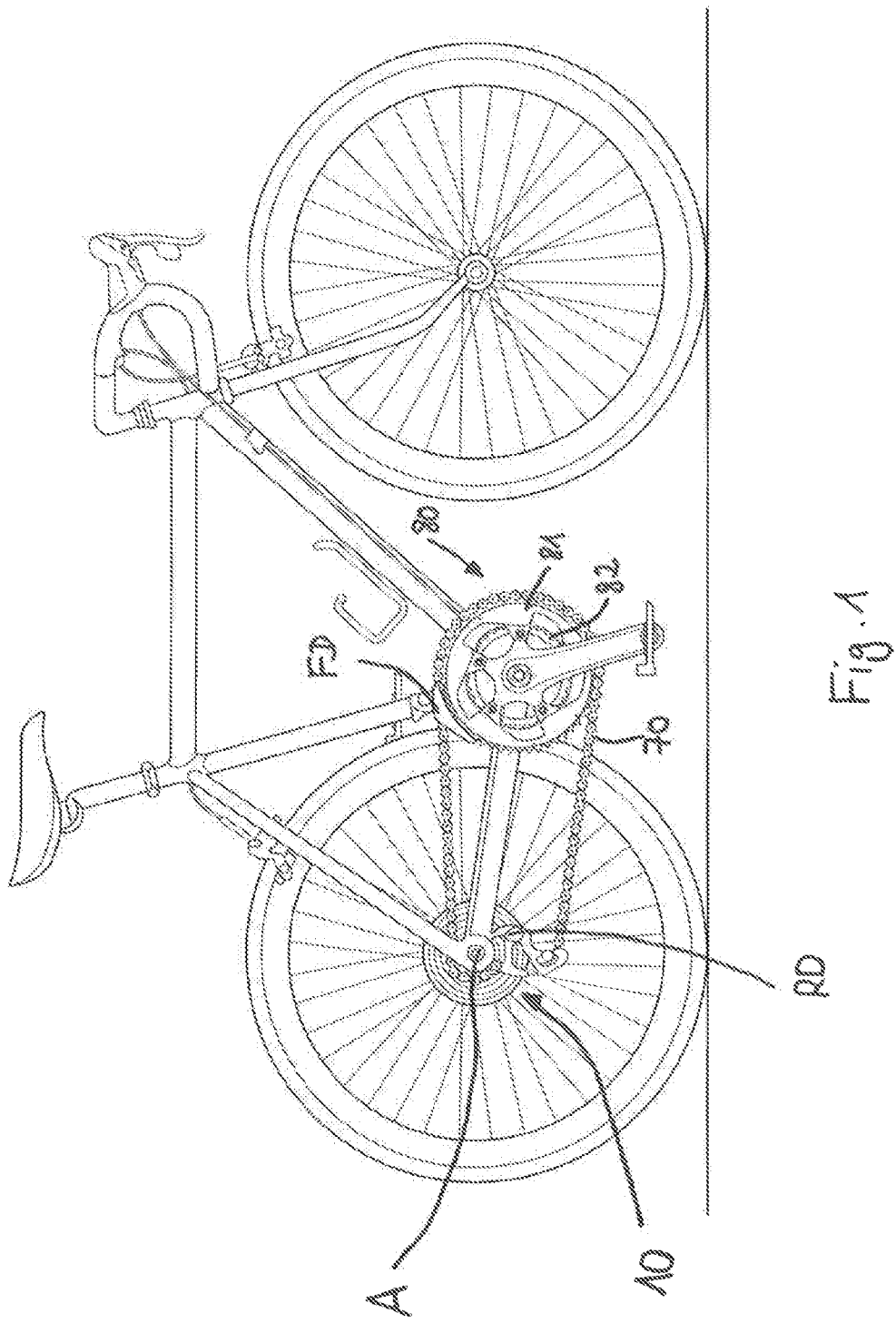

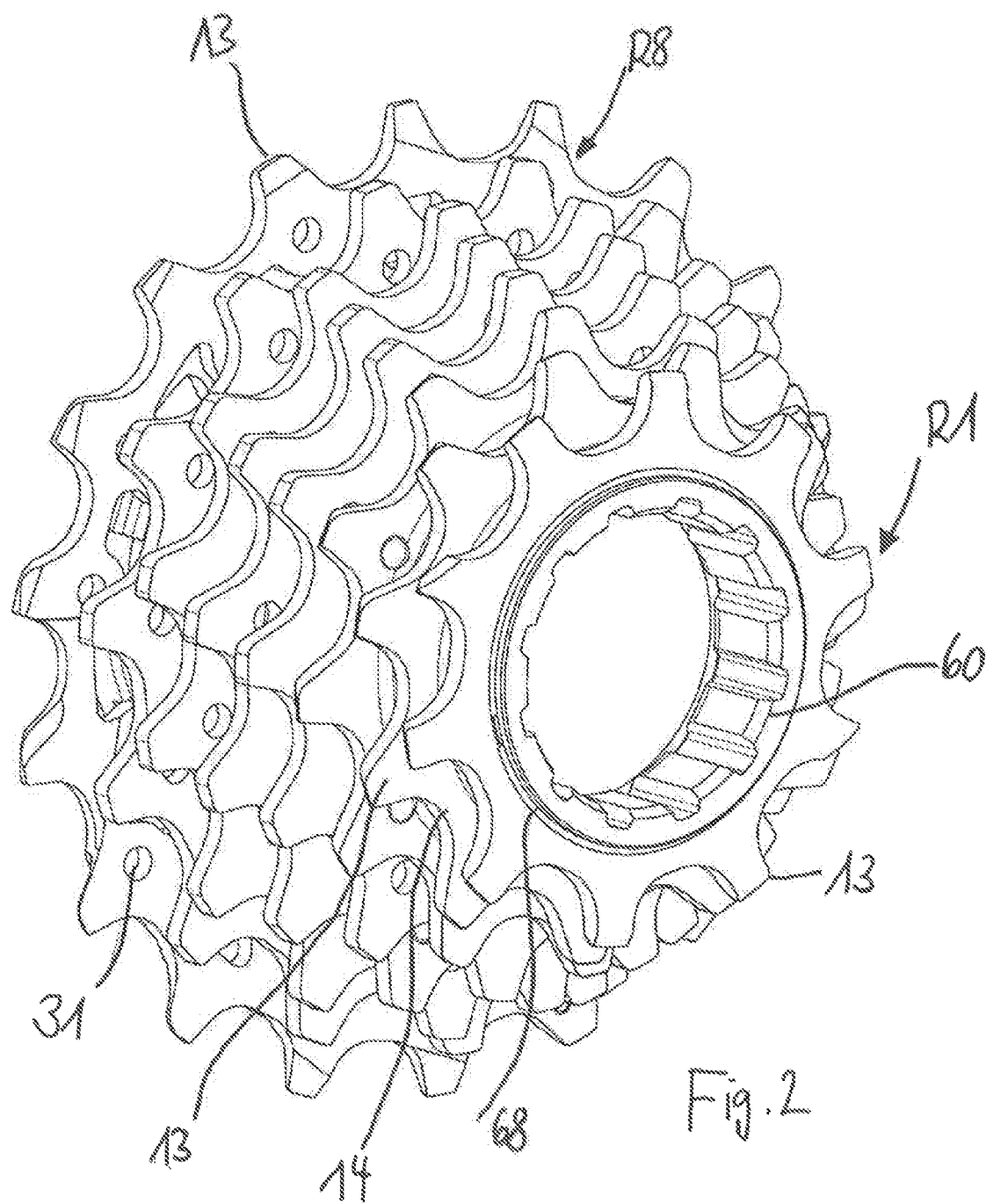

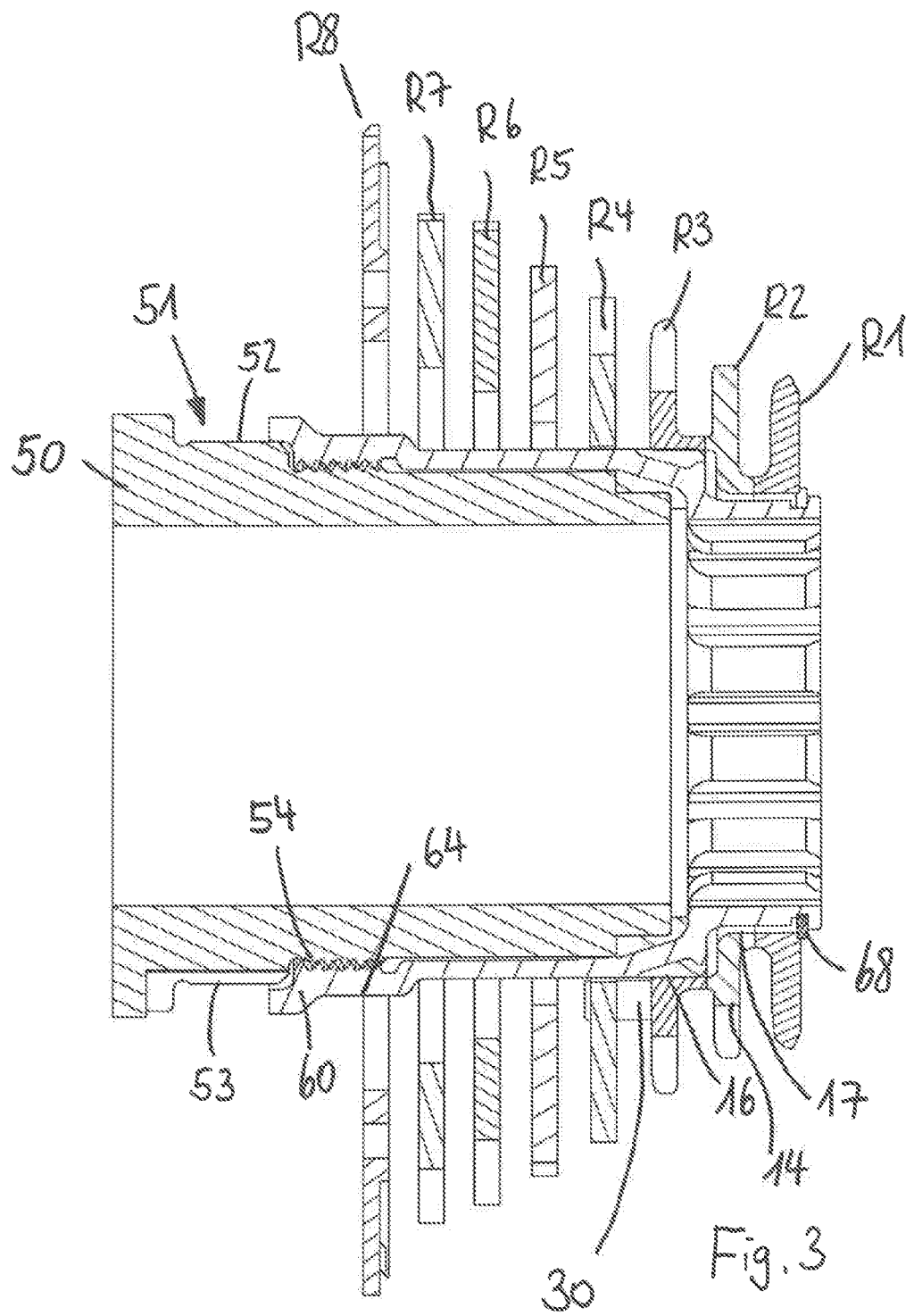

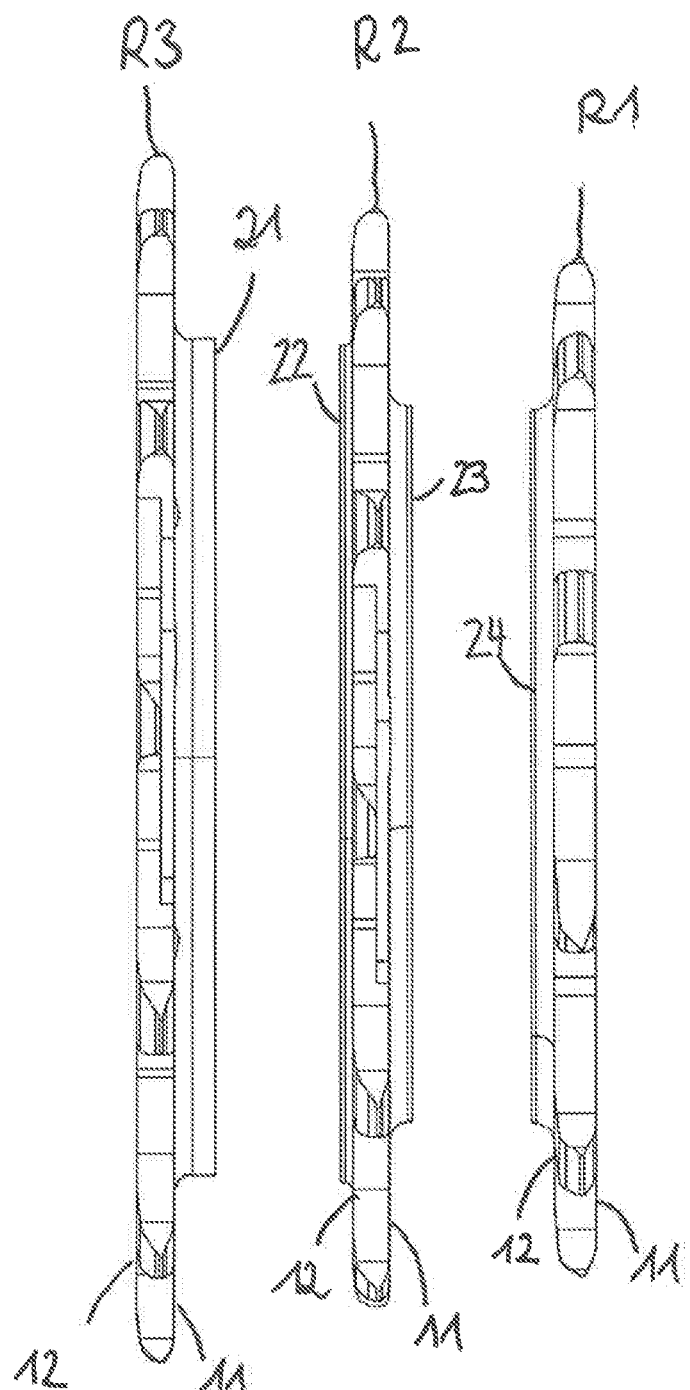

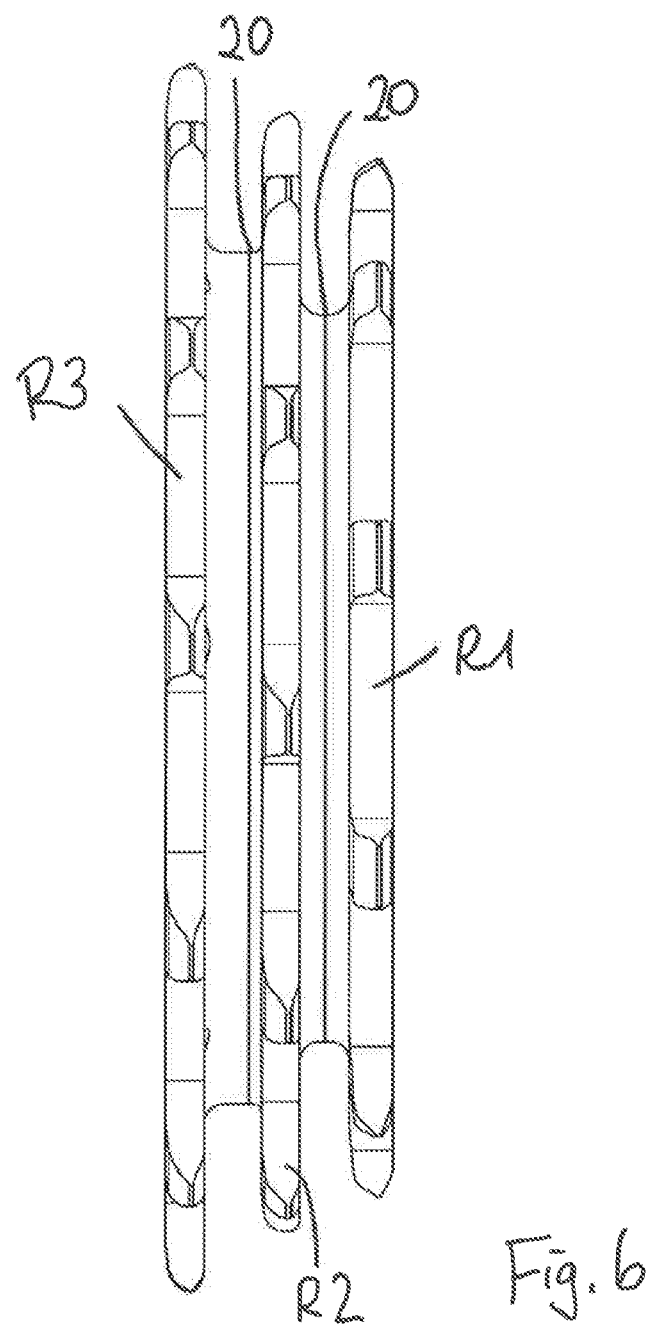

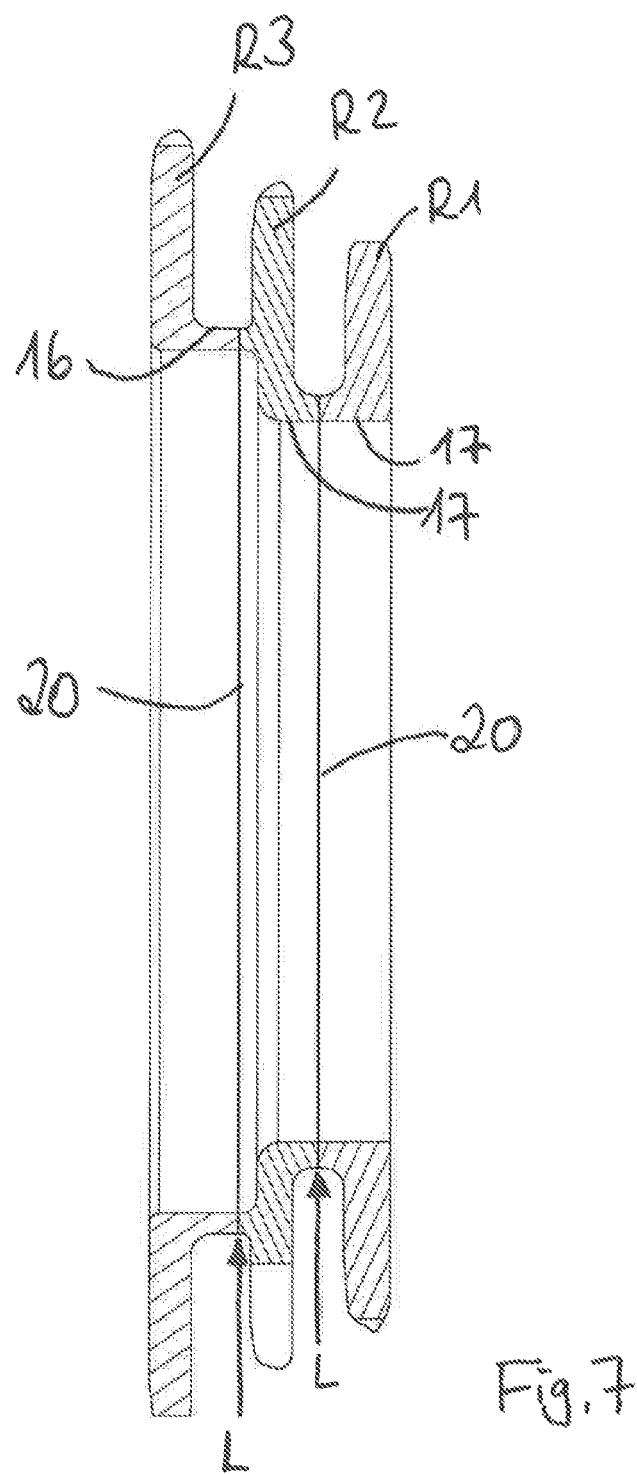

MULTI SPROCKET ARRANGEMENT WITH WELD CONNECTION

This application claims priority to, and/or the benefit of, German patent application DE 10 2017 000 855.8, filed on Jan. 31, 2017, the contents of which are referenced herein in their entirety.

FIELD OF THE INVENTION

The invention generally relates to a bicycle drive, and specifically the invention relates to a multi-sprocket arrangement for installation on a rear-wheel hub of a bicycle, and/or to a bicycle drive having the multi-sprocket arrangement.

BACKGROUND

The number of sprockets on multi sprocket arrangements for mounting on a rear wheel hub of a bicycle has increased ever further in recent years. Arrangements with sprockets with a particularly large number of teeth, in particular 50 teeth and more, and/or sprockets with a particularly small number of teeth, in particular ten teeth or less, increase the translation ratio or spread of the drive. The increased number of twelve or more sprockets however also brings problems. Firstly, the installation space in which the sprocket package is arranged is restricted because of the bicycle geometry and various technical standards. The axial installation space for the multi sprocket arrangement is predefined on the inside by the hub driver limit stop and the running wheel spokes, and on the outside by the frame limit stop. In mounted state, the largest sprocket of the multi sprocket arrangement hits against the driver limit stop in the axial direction. The largest sprockets of the sprocket package may follow the course of the running wheel spokes (also described as overhanging sprockets). At the same time, the material of the sprockets available in the radial direction is limited, in particular with very small sprockets with eleven, ten or nine teeth. These have a smaller outer diameter but a proportionally relatively large inner diameter, so the material height in the radial direction is low.

The increased number of sprockets also demands economic production. Economic production methods are known in which punched individual sprockets are connected together in a subsequent mounting step, e.g. by push-fit connection, as described in DE 10 2013 012 066 by the applicant. For very small sprockets however, there is insufficient space in the radial direction for such a push-fit connection between adjacent sprockets. This problem is particularly pronounced is there is only a small tooth jump between adjacent sprockets, i.e. the number of teeth of adjacent sprockets differs only by one or two teeth. For example, with the three smallest sprockets with ten, eleven and twelve teeth. These sprockets are formed particularly narrowly in the radial direction and offer little space for connecting elements and their corresponding openings.

The object therefore arises of providing a multi sprocket arrangement with an increased number of sprockets, which firstly can be produced simply and economically and secondly is suitable for slim sprockets and sprockets with small diameter.

SUMMARY AND DESCRIPTION

In an embodiment, a multi sprocket arrangement for mounting on a driver of a bicycle wheel includes a plurality of adjacent sprockets each of the plurality of sprockets having a different number of teeth. The plurality of adjacent sprockets include a first sprocket having a first inner diameter which is larger than an outer diameter of a profile base of a carrier profile of the driver, and a second sprocket having a second inner diameter which is smaller than the outer diameter of the profile base of the carrier profile of the driver. The first sprocket and the second sprocket are connected together by welding.

In an embodiment, a bicycle drive includes a bicycle chain and a multi sprocket arrangement for mounting on a driver of a bicycle wheel. The multi sprocket arrangement includes a plurality of adjacent sprockets each of the plurality of sprockets configured to interact with the bicycle chain and having a different number of teeth. The plurality of adjacent sprockets include a first sprocket having a first inner diameter which is larger than an outer diameter of a profile base of a carrier profile of the driver, and a second sprocket having a second inner diameter which is smaller than the outer diameter of the profile base of the carrier profile of the driver, wherein the first sprocket and the second sprocket are connected together by welding. The bicycle drive also includes a chain sprocket arrangement with at least one chain sprocket configured to interact with the bicycle chain.

BRIEF DESCRIPTION OF THE DRAWINGS

FIG. 1 shows a bicycle with a bicycle drive according and embodiment of a multi sprocket arrangement;

FIG. 2 shows a perspective partial view of a first embodiment of a multi sprocket arrangement without driver;

FIG. 3 shows a sectional view of the first embodiment from FIG. 2 mounted on a driver;

FIG. 5 shows a side view of sprockets not joined together;

FIG. 6 shows a side view of sprockets of FIG. 5 joined together;

FIG. 7 shows a sectional view of the joined sprockets from FIG. 6;

DETAILED DESCRIPTION OF THE DRAWINGS

Figure 4C:
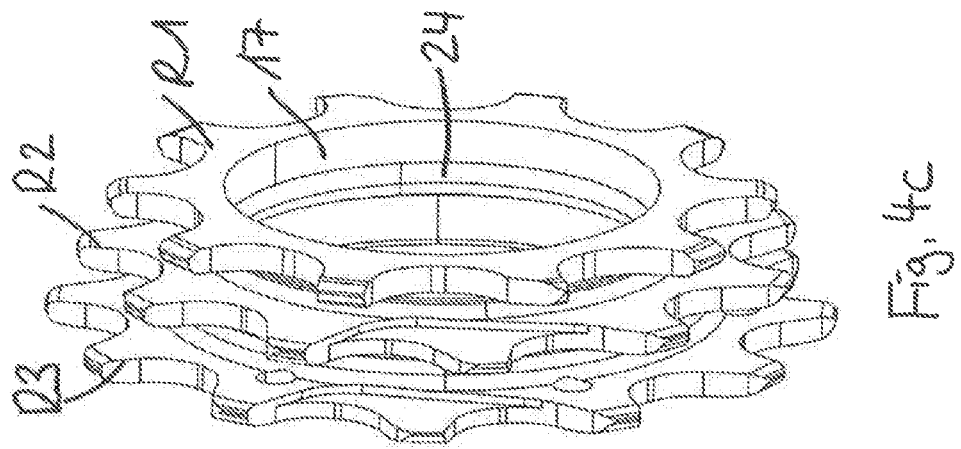
FIG. 4c shows a perspective view of the joined cluster.
Figure 4B:
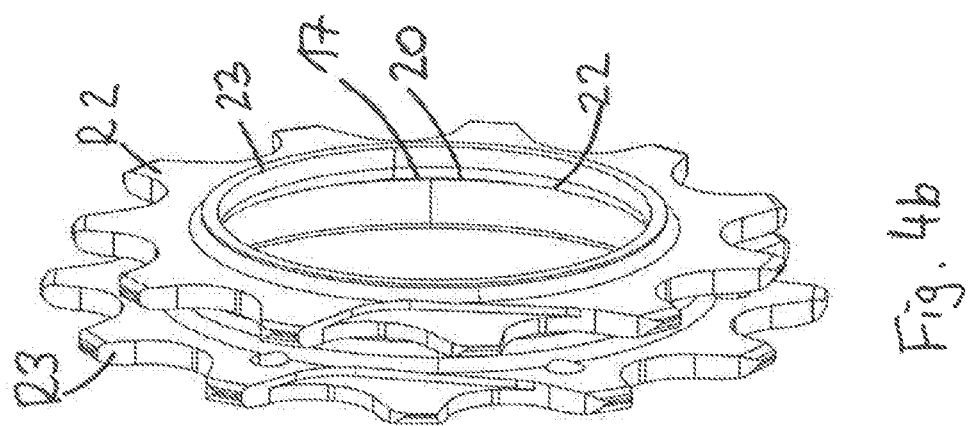
FIG. 4b shows a perspective view of sprockets joined together.
Figure 4A:
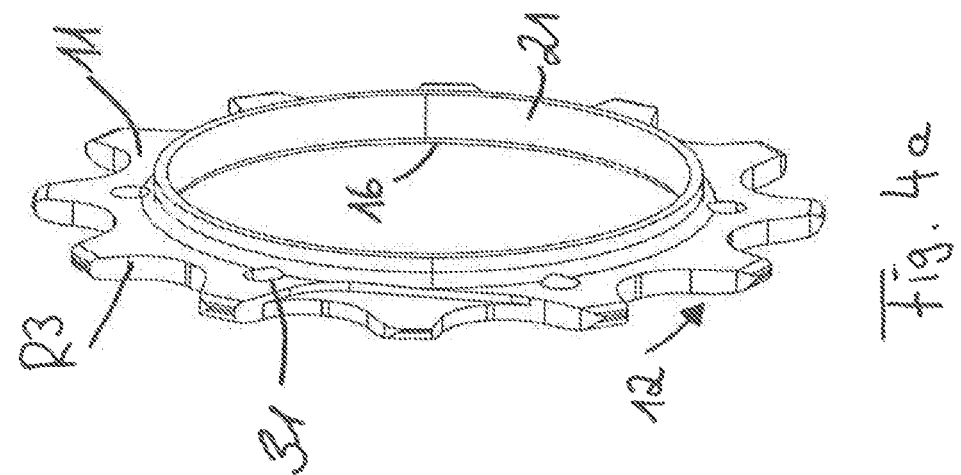
FIG. 4a shows a perspective view of a sprocket.

The object is achieved by a multi sprocket arrangement for torque-transmitting mounting on a driver with a carrier profile and for engagement in a bicycle chain, as is described herein.

The multi sprocket arrangement has a plurality of adjacent sprockets each with a different number of teeth. Corresponding to the different number of teeth, adjacent sprockets also have differently sized outer diameters. As the number of teeth increases, the outer diameter increases, and conversely. At least one first sprocket of the plurality of adjacent sprockets has a first inner diameter which is larger than an outer diameter of a profile base of the carrier profile of the driver. At least one second sprocket of the plurality of adjacent sprockets has a second inner diameter which is smaller than the outer diameter of the profile base of the carrier profile of the driver. The first sprocket and the second sprocket are connected together by welding.

It is advantageous that, because of its inner diameter which is reduced relative to the driver, the second sprocket allows a particularly small number of teeth. At the same time, the weld connection between the first and second sprockets requires little space, so that the installation space available in the axial and radial direction may be observed. The dimensions of the sprockets welded together scarcely deviate from those of an integrally produced, in particular milled, sprocket package. A weld connection is however easier and more economic to make and join.

Using the carrier profile of the driver, the multi sprocket arrangement may be brought into engagement therewith in torque-transmitting fashion. The carrier profile of the driver has a profile base and profile protrusions extending from the base. The carrier profile of the driver accordingly has a smaller outer diameter along its base than along its protrusions.

According to one embodiment of the multi sprocket arrangement, the first sprocket is welded directly to the second sprocket.

According to one embodiment of the multi sprocket arrangement, the first sprocket R3 has a first flange portion. The first flange portion of the first sprocket R3 butts against a substantially flat back side of the second sprocket R2. The first and second sprockets are welded together along the first flange portion.

Furthermore or alternatively, the second sprocket R2 has a second flange portion. The second flange portion butts against a substantially flat front side of the first sprocket. The first and second sprockets are welded together along the second flat portion.

Thus embodiments are conceivable in which the flange portion extends either from the larger sprocket R3 to the smaller sprocket R2, or from the smaller sprocket R2 to the larger sprocket R3, or two flange portions extend in opposite directions between the sprockets and each butt against a flat side of the adjacent sprocket. To ensure that the two flange portions do not collide, these must either be offset to each other in the radial direction or interrupted in the circumferential direction and arranged offset to each other (this embodiment is not shown in the figures).

According to an embodiment of the multi sprocket arrangement, the first sprocket R3 has a first flange portion and the second sprocket R2 has a second flange portion. The first and second sprockets are adjacent. The first flange portion of the first sprocket R3 and the second flange portion of the second sprocket R2 point towards each other. The first sprocket R3 along the first flange portion is connected to the second sprocket R2 along the second flange portion by welding.

In contrast to the preceding embodiments in which a flange portion is welded to the flat sprocket side, in an embodiment adjacent sprockets are each welded along their flange portions. The advantage of this embodiment is that, because of the two flange portions pointing towards each other, the weld seam is spaced from the sprockets. In particular, the weld seam lies centrally between the two sprockets to be connected and can therefore easily be reached with the welding device. This advantage exists irrespective of the size of the inner diameter of the sprockets, and is also applicable to other multi sprocket arrangements, irrespective of whether or not very small sprockets are arranged axially in front of the driver. With this embodiment, the joining energy can be supplied at a right angle, which is ideal for producing an even weld seam. For example, in laser welding, a laser beam L may be directed at right angles onto the flange portions to be connected. With this laser alignment, minimum energy is required and an accurate alignment of the welding device and welding tool is easiest to achieve. Weld connections between sprockets known from the prior art have no or just one flange portion on just one of the two sprockets to be connected. The flange portion is connected to the adjacent flat sprocket. Thus the weld seam lies in a corner formed between the flange portion and the flat sprocket, which is difficult to reach with the welding device. The welding device, in particular the laser welding device, must be oriented obliquely onto this corner in order not to damage the flat sprocket accidentally. An oblique angle of incidence complicates the production of an even weld seam.

According to an embodiment, the second sprocket R2 has a third flange portion. A third sprocket R1 is connected to the second sprocket R2 via the third flange portion. The third flange portion is arranged on the front side of the second sprocket R2.

The back side of the second sprocket R2 may either have a second flange portion or, according to another embodiment, be flat or free from flange portions.

In an embodiment, the third sprocket R1 has an inner diameter which is also dimensioned smaller than the outer diameter of the profile base of the carrier profile of the driver. The third sprocket R1 may also be regarded as a further second sprocket R2, because it also differs from first sprocket R3 because of its inner diameter which is smaller than that of the driver. In other words, the multi sprocket arrangement may comprise two second sprockets (R2 and R1). In an embodiment, the inner diameter of the second sprocket R2 and the third sprocket R1 may be of the same size.

In an embodiment, the third sprocket R1 may on its back side have a fourth flange portion along which it is connected to the third flange portion of the second sprocket R2 by welding.

In an embodiment, the first sprocket R3 may have a fifth flange portion to which a fourth, next larger, sprocket R4 is connected by welding. The fifth flange portion is arranged on the back side of the first sprocket R3. The front side of the first sprocket R3 may either have a first flange portion or, according to another embodiment, be flat or free from flange portions.

The flange portion or portions of the preceding embodiments extend in the axial direction, i.e. parallel to the rear wheel axis A. The flange portion thus extends at a 90° angle to the sprocket. The axial spacing between adjacent sprockets results from the axial length of the flange portions. Each flange portion has a free end which points either in the direction of the next smaller sprocket (towards the front) or in the direction of the next larger sprocket (towards the rear).

A flange portion may be produced in various ways. It would be conceivable firstly to produce a flat sprocket by punching, and in a further step create the flange by deformation or material removal (turning, milling or similar). The sprocket and flange may however also be produced in just one working step by forming (punching, deep drawing or similar). If necessary, subsequent working steps may ensure a clean sprocket contour.

In an embodiment, the flange portion extends in the circumferential direction of the sprocket. The flange portion has a diameter which is smaller than the root circle diameter of the two sprockets to be connected. This ensures that the chain does not collide with the flange portion when it is brought into engagement with the sprockets. In the case where the flange portions point towards each other and are connected together, the two flange portions have the same diameter.

A flange portion may extend continuously in the circumferential direction of the sprocket and form a closed cylinder. Alternatively, the flange portion could be formed from several circle segments or protrusions. Such circle segments or protrusions can be produced particularly easily by bending the inner sprocket diameter of the initially flat sprocket. A multi sprocket arrangement may combine both continuous and interrupted flange portions.

According to another embodiment of the multi sprocket arrangement, the first sprocket R3 is welded to the second sprocket R2 not directly but indirectly.

In particular, the first and second sprockets R3, R2 may be connected together via a tubular element. For this, both the first sprocket R3 and the second sprocket R2 are connected to the tubular element by welding.

Further sprockets, in particular a third sprocket R1, may also be connected to the tubular element by welding.

The tubular element may be formed so as to be stepped. It has a first portion with a larger inner diameter and a second portion with a smaller inner diameter.

The tubular element welded to the sprockets is then pushed onto the driver or the intermediate adapter. The inner diameter of the tubular element must be matched to the outer diameter of the driver or adapter. The material thickness of the tubular element is therefore counted as part of the sprocket, so that the inner diameter of the tubular element is understood as being the inner diameter of the sprocket according to the claims. The inner diameter of the first portion of the tubular element is larger than the base of the carrier profile of the driver. Accordingly, the smaller inner diameter of the tubular element is smaller than the profile base of the carrier profile of the driver.

The advantage with this embodiment is that no flange portions are required between the sprockets, but the flat sprockets are welded to the tubular element. This allows a particularly economic production of the sprockets. In order to make the connection between the sprockets and the tubular element particularly stable, it would however also be conceivable to increase the contact area of the sprocket on the tube, e.g. by a fold along the inner diameter.

The welded parts form a cohesive cluster which can no longer be separated, with at least one first and one second sprocket. In particular, the three smallest sprockets of a multi sprocket arrangement are joined directly or indirectly into a cluster by welding. The advantages of the embodiments disclosed herein over the prior art may be of particular use for the smallest sprockets.

Evidently, however, also more than three sprockets, or all sprockets of the multi sprocket arrangement may be connected together by welding. It is also conceivable to combine the above-mentioned exemplary embodiments with other joining techniques.

According to an embodiment of the multi sprocket arrangement, a third sprocket R1 is connected to the second sprocket R2 using a separate connecting mechanism. Alternatively, also a fourth sprocket R4 may be connected to the first sprocket R3 using a separate connecting mechanism. A third sprocket R1 may be connected to the second sprocket R2, and a fourth sprocket R4 connected to the first sprocket R3, using a separate connecting mechanism. In addition to the above-mentioned direct or indirect weld connection between the first and second sprockets, there is therefore also at least one further connection using a separate connecting mechanism.

In particular, the separate connecting mechanism may be configured as retaining pins or rods extending parallel to the rear wheel axis. The retaining pins are pressed into openings in the sprockets. The openings are arranged in a hole ring. Two adjacent sprockets each have a hole ring of the same diameter with a plurality of openings.

The fourth sprocket may have an inner hole ring with openings and an outer hole ring with openings. If a sprocket is connected both to an adjacent sprocket of smaller diameter and to an adjacent sprocket of larger diameter, this sprocket must have two hole rings. An inner hole ring which serves for connection to the adjacent smaller sprocket, and an outer hole ring which serves for connection to the adjacent larger sprocket. Such a connection with two hole rings spaced apart has an advantageous effect on the force transmission between the adjacent sprockets. The drive force is transmitted from the chain to a sprocket of the arrangement in engagement with the chain, and from this sprocket via the adjacent sprockets to a sprocket standing in torque-transmitting engagement with the driver. Two hole rings spaced apart from each other are however possible only if the sprocket has sufficient space in the radial direction. With sprockets of small diameter, this is not always the case.

The multi sprocket arrangement may have at least one sprocket with an inner profile which can be brought into engagement with the carrier profile of the driver and serves for torque transmission. In particular, the largest or one of the largest sprockets of the sprocket arrangement is suitable as a torque-transmitting sprocket.

According to one embodiment, at least one sprocket of the sprocket arrangement may have a sequence of a thin tooth, a thick tooth and a further thin tooth. A thick tooth is formed so thick in the axial direction that it can engage in an outer tab pair of the chain, but not in an inner tab pair. This has a positive effect on the chain guidance. The sequence may be repeated several times along the circumference of a sprocket. For sprockets with an even number of teeth, all teeth may be formed as alternate thin and thick teeth. The axial thickening may be made either on both sides of the sprocket or just on one. Preferably, the thickening is arranged only on the back side of the sprocket. It is of particular importance precisely on the two largest sprockets because there the chain skew is at its greatest. The improved chain guidance minimises the negative consequences of chain skew.

According to one embodiment, at least some of the adjacent sprockets may be produced integrally, in particular by milling. A multi sprocket arrangement with a combination of integrally produced sprockets, sprockets welded together and sprockets connected by a separate connecting mechanism (retaining pins, spiders, riveting or similar) is also conceivable.

Another aspect of the invention concerns a bicycle drive which comprises a multi sprocket arrangement, a bicycle chain and a chain sprocket arrangement with at least one chain sprocket. In particular, the drive comprises a multi sprocket arrangement with twelve sprockets (R1-R12) and a chain sprocket arrangement with two chain sprockets. Such a bicycle drive may have an electrically controlled rear derailleur (RD) and/or an electrically controlled front derailleur (FD). These may be controlled without cables. The directional specifications right/left, upward/downward and rearward/forward used herein relate to a bicycle as viewed in a direction of travel (cf. FIG. 1). The directional specifications inward/outward relate to the centre of the bicycle. Axially relates to the central axis of the multi-sprocket arrangement. Accordingly, the sprockets of smaller diameter with a smaller number of teeth of the multi-sprocket arrangement are arranged axially further to the right or further outward (also referred to as "outboard") than the sprockets of larger diameter with a larger number of teeth. The larger sprockets are conversely thus arranged axially further to the left or further inward (also referred to as "inboard") than the smaller sprockets. By contrast to this, the smaller chain ring of the front chain ring arrangement is arranged further to the left or further to the inside than the large chain ring. The teeth are arranged radially at the outside on the sprocket and on the chain ring.

The directional references "front" and "back" used below refer respectively to the front and back sides of the sprocket. The front side of a sprocket points towards the next smaller sprocket. The back side of a sprocket points towards the next larger sprocket. The term "axial" relates to the rear wheel axis or rotational axis of the multi sprocket arrangement. The teeth are arranged radially on the outside of the sprocket. The outer diameter of the sprocket is the radially outer end, the inner diameter is the radially inner end of the sprocket. The figures show, purely as an example and for better clarity, only some of the sprockets of the multi sprocket arrangement.

FIG. 1 shows a bicycle with a multi sprocket arrangement 10 and a bicycle drive. The bicycle drive consists of a chain ring arrangement 80 which has a small chain ring 82 and a large chain ring 81, a multi sprocket arrangement 10 and a bicycle chain 70. The multi sprocket arrangement 10 comprises an increased number of adjacent sprockets R, in particular twelve sprockets R1 to R12, which are here depicted merely diagrammatically. The sprockets R of the sprocket arrangement 10 have different numbers of teeth, and are arranged at a predefined axial spacing from each other. The bicycle chain 70 is in engagement with the teeth of one of the chain rings, in the case shown the largest chain ring 82 of the chain ring arrangement 80, and the teeth of one of the adjacent sprockets R of the multi sprocket arrangement 10. Using the bicycle chain 70, the force is transmitted from the chain ring arrangement 80 to the rear multi sprocket arrangement 10, and from there via the driver to the rear wheel hub. The front derailleur FD and/or the rear derailleur RD may be operated either mechanically or electrically. In the exemplary embodiment shown, both the electric front derailleur FD and the electric rear derailleur RD are controlled—in particular without cables—by one or more selector devices mounted on the handlebar. For a chain ring arrangement with just one chain ring, the front derailleur FD is omitted.

The selector device is suitable not only for a racing bicycle as shown, but may be used on a wide range of bicycle types such as mountain bikes, touring bikes or E-bikes. Depending on the drive type, different numbers of teeth from those shown in the figures below are possible. For a drive with just one front chain ring and thirteen rear sprockets, in particular there may be nine, ten or eleven teeth on the smallest sprocket and 36 teeth on the largest sprocket. Drives for mountain bikes may have an even greater spread. In sprocket arrangements with eleven sprockets, in particular ten teeth on the smallest sprocket and 42 teeth on the largest sprocket are conceivable, or eleven teeth on the smallest sprocket and 46 teeth on the largest sprocket. In arrangements with twelve sprockets, a suitable spread comprises ten teeth on the smallest sprocket and 50 teeth on the largest sprocket, or eleven teeth on the smallest and 55 teeth on the largest sprocket.

FIGS. 2 to 7 show a first embodiment of the multi sprocket arrangement.

FIG. 2 shows a perspective front view of the first embodiment of the multi sprocket arrangement without driver. As an example, only some (R1 to R8) of the increased number of in particular twelve sprockets of the multi sprocket arrangement are shown. The sprocket R1 is the smallest diameter sprocket of the multi sprocket arrangement with ten teeth 13. The second smallest sprocket R2 has eleven teeth, the third smallest sprocket R3 has twelve teeth. There is therefore only one tooth step between the three smallest sprockets R1, R2, R3, so that their outer diameters differ only slightly. The multi sprocket arrangement may be fixed axially on a driver with the adapter 60.

FIG. 3 shows a sectional depiction of the first embodiment from FIG. 2. Here, the multi sprocket arrangement is shown mounted on a driver 50. The sprocket package comprises in particular twelve adjacent sprockets (R1-R12) with different diameters and associated different numbers of teeth—again, only eight of the twelve sprockets (R1 to R8) are shown. The largest sprocket R12 (not shown here) stands in torque-transmitting engagement with the driver 50 which transmits the torque further to a rear wheel hub (not shown here). For this, the torque-transmitting sprocket has an engagement profile which can be brought into torque-transmitting engagement with the carrier profile 51 on the driver 50. The carrier profile 51 of the driver 50 includes a profile base 53 and profile protrusions 52. The profile protrusions 52 protrude above the profile base 53 and have a larger outer diameter than the profile base 53. The profile base 53 of the driver 50 serves as a reference below. The multi sprocket arrangement thus has at least one first sprocket R3, the inner diameter 16 of which is larger than the outer diameter of the profile base 53. Even an only slightly larger inner diameter 16 is sufficient to fulfil this feature. The second sprocket R2 has a second inner diameter 17 which is smaller than the outer diameter of the profile base 53. In the case shown, the inner diameter 17 is significantly smaller. The smallest or third sprocket R1 also has an inner diameter which is smaller than the outer diameter of the profile base 53. The inner diameters 17 of the two sprockets R1 and R2 are the same size. Alternatively, the inner diameter of the smallest sprocket R1 could be configured even smaller. Accordingly, the adapter lying below may be adapted with a further step. The two sprockets R1 and R2 are arranged axially in front of the driver 50. Only in this way is it possible to fit particularly small sprockets with eleven, ten or even nine teeth.

The connection between the first sprocket R3 of larger diameter and the adjacent second sprocket R2 of smaller diameter is particularly critical because very little space is available for a connection in the radial direction. The space in the radial direction is limited firstly by the inner diameter 16 of the first sprocket R3 and secondly by the tooth base 14 (or root circle diameter 15) of the second sprocket R2. An embodiment solves this problem with an economic and compact weld connection between the first sprocket R3 and the second sprocket R2. The advantage of weld connections is that in both the axial and radial directions, they require no or only very little extra space compared with integral production.

The adapter 60 with its internal thread 64 is screwed onto the corresponding external thread 54 of the driver 50. A retaining ring 68 fitted between the smallest sprocket R1 and the end of the adapter 60 prevents the multi sprocket arrangement from slipping axially off the adapter 60. The adapter 60 has a smaller outer diameter and the retaining ring 68 has a larger outer diameter than the inner diameter of the smallest sprocket R1. The retaining ring 68 sits in a circumferential groove of the adapter 60. In this way the sprocket package is fixed on the driver 50 in the axial direction.

FIGS. 4 to 7 show the sprockets R1-R3 in various joining stages. The first sprocket R3 has a first flange portion 21 on its front side 11. The back side 12 has no flange portions. The second sprocket R2 has a second flange portion 22 on its back side 12. The first flange portion 21 and the second flange portion 22 point towards each other and have equal-sized diameters. The second sprocket R2 may have a third flange portion 23 on its front side 11. The third sprocket R1 has a fourth flange portion 24 on its back side 12. The third flange portion 23 and the fourth flange portion 24 also point towards each other and have equal-sized diameters. The length of the flange portions may vary depending on the desired spacing between the sprockets. The first flange portion 21 is slightly longer than the others so that the weld seam does not collide with the end of the adapter 60 to be fitted underneath. The sprockets R1 to R3 are joined together in that, in each case, two adjacent sprockets are welded together along their flange portions pointing towards each other. In this way, a circumferential weld seam 20 is formed between the sprockets R3 and R2 along the first and second flange portions 21, 22, and a weld seam 20 is formed between the sprockets R2 and R1 along the third and fourth flange portions 23, 24.

In FIG. 7, the angle of incidence of the laser beam L is indicated by arrows. The flange portions pointing towards each other allow the advantageous, perpendicular orientation of the laser relative to the workpiece.

Figure 8:
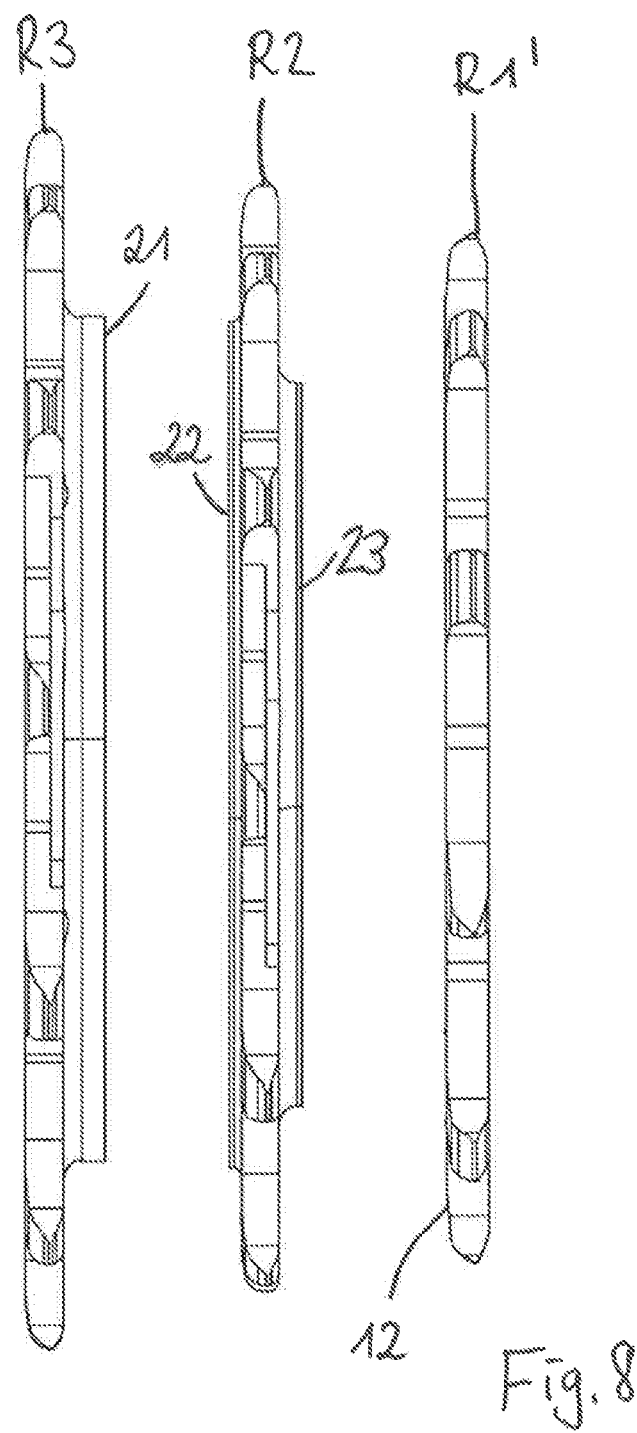
FIG. 8 shows a side view of a second embodiment, with sprockets not joined.

FIG. 8 shows an alternative first embodiment which differs from FIG. 5 in respect to the smallest sprocket R1'. In contrast to sprocket R1 of the previous exemplary embodiment, this sprocket R1' is flat on both sides and has no flange portions. The third flange portion 23 of the second sprocket R2 butts against the flat back side 12 of the smallest sprocket R1' and is welded thereto. In this case, the laser beam must be oriented obliquely in order to produce the weld seam located in the corner. The length of the flange portion 23 at the same time determines the spacing between sprockets R2 and R1'.

In a first working step, sprockets R1, R2 and R3 and the flange portions are produced. In a second working step, the first and second flange portions 21, 22 are welded together, i.e. sprockets R3 and R2 are joined together. In a third working step, sprockets R1 and R2 are welded together along their flange portions 23, 24. Laser welding is a preferred welding technique. For this, two adjacent sprockets or all three sprockets to be connected are attached to a welding tool. The welding tool together with the sprockets to be connected is rotated about its own axis. The beam L of the laser welding device is oriented at a right angle onto the surfaces to be joined, and because of the rotation forms a circumferential weld seam 20.

Figure 9:
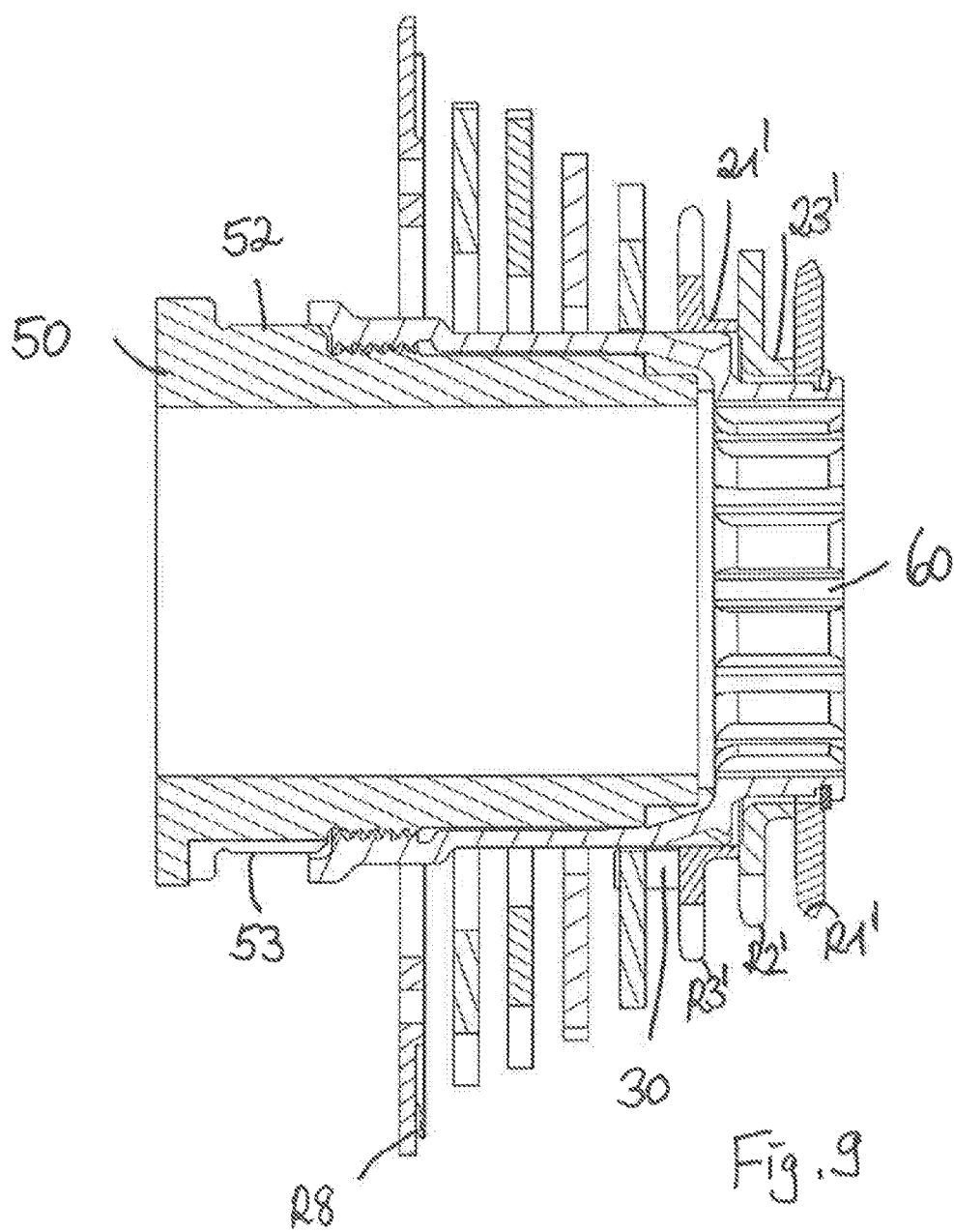
FIG. 9 shows a sectional view of the second embodiment mounted on a driver.
Figure 10:
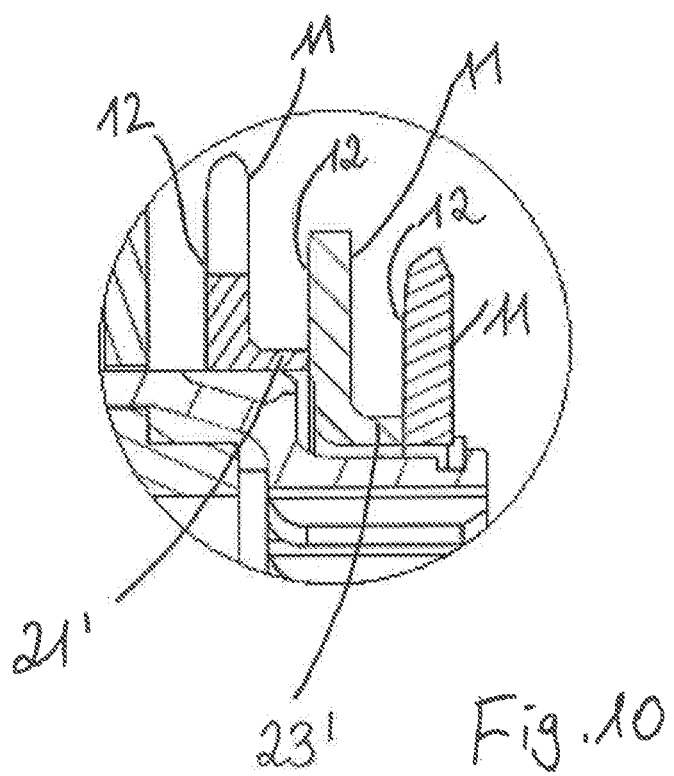
FIG. 10 shows a detail view of an extract from FIG. 9.
Figure 11:
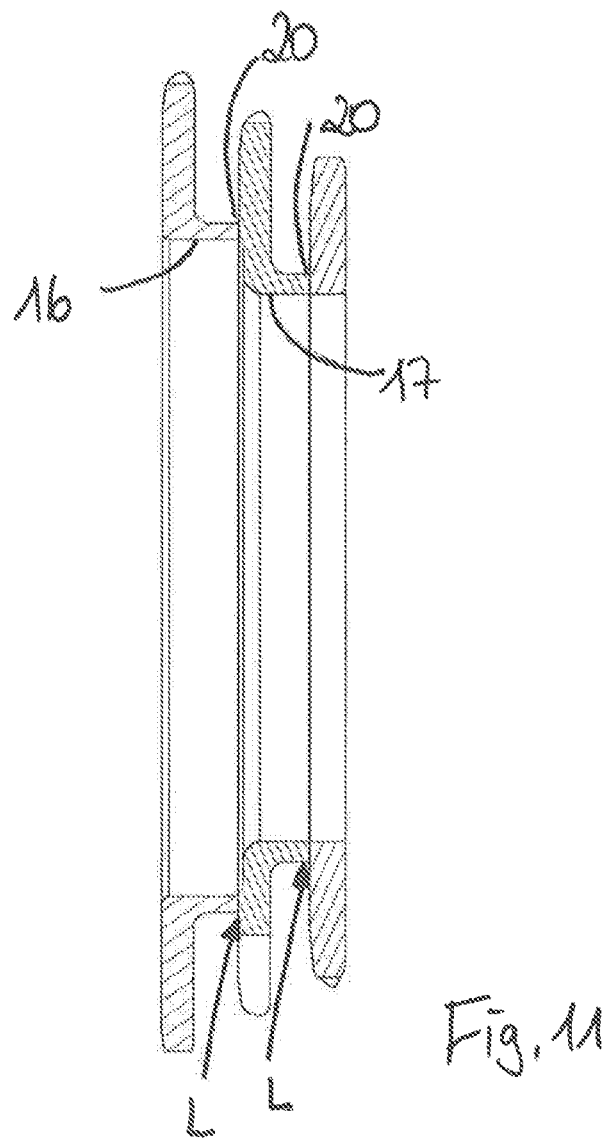
FIG. 11 shows a sectional view of the three smallest sprockets of the second embodiment joined together.
Figure 12:
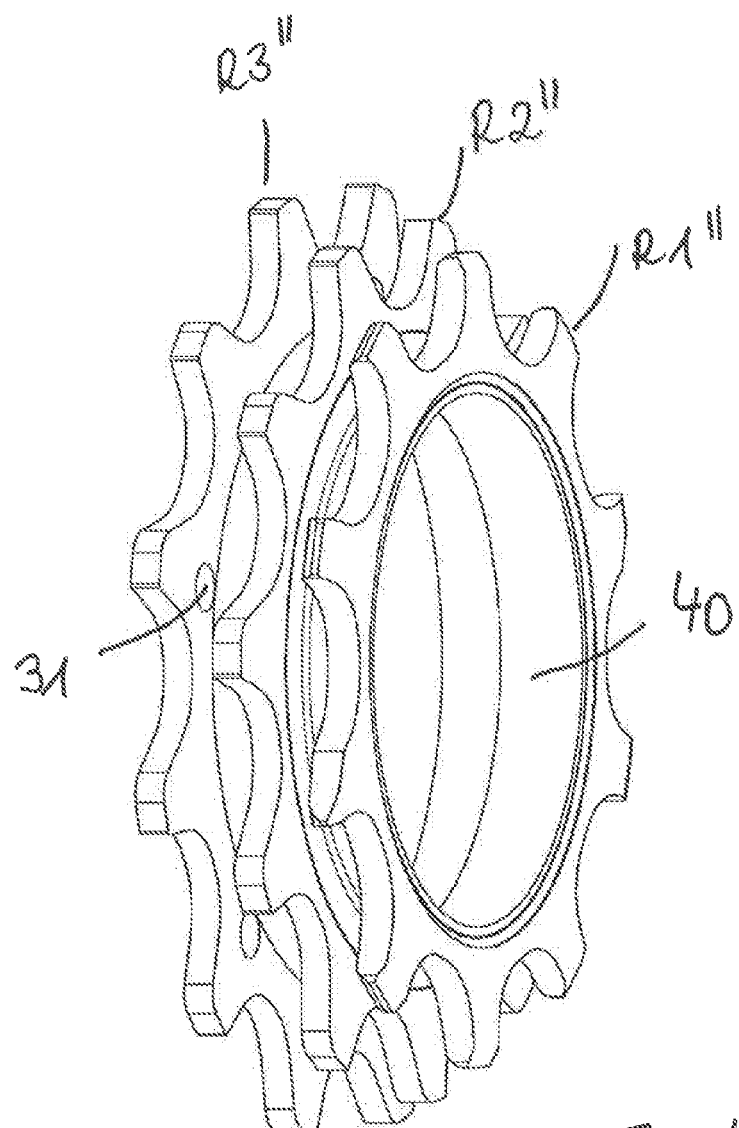
FIG. 12 shows a perspective view of the three smallest sprockets of a third embodiment.
Figure 13:
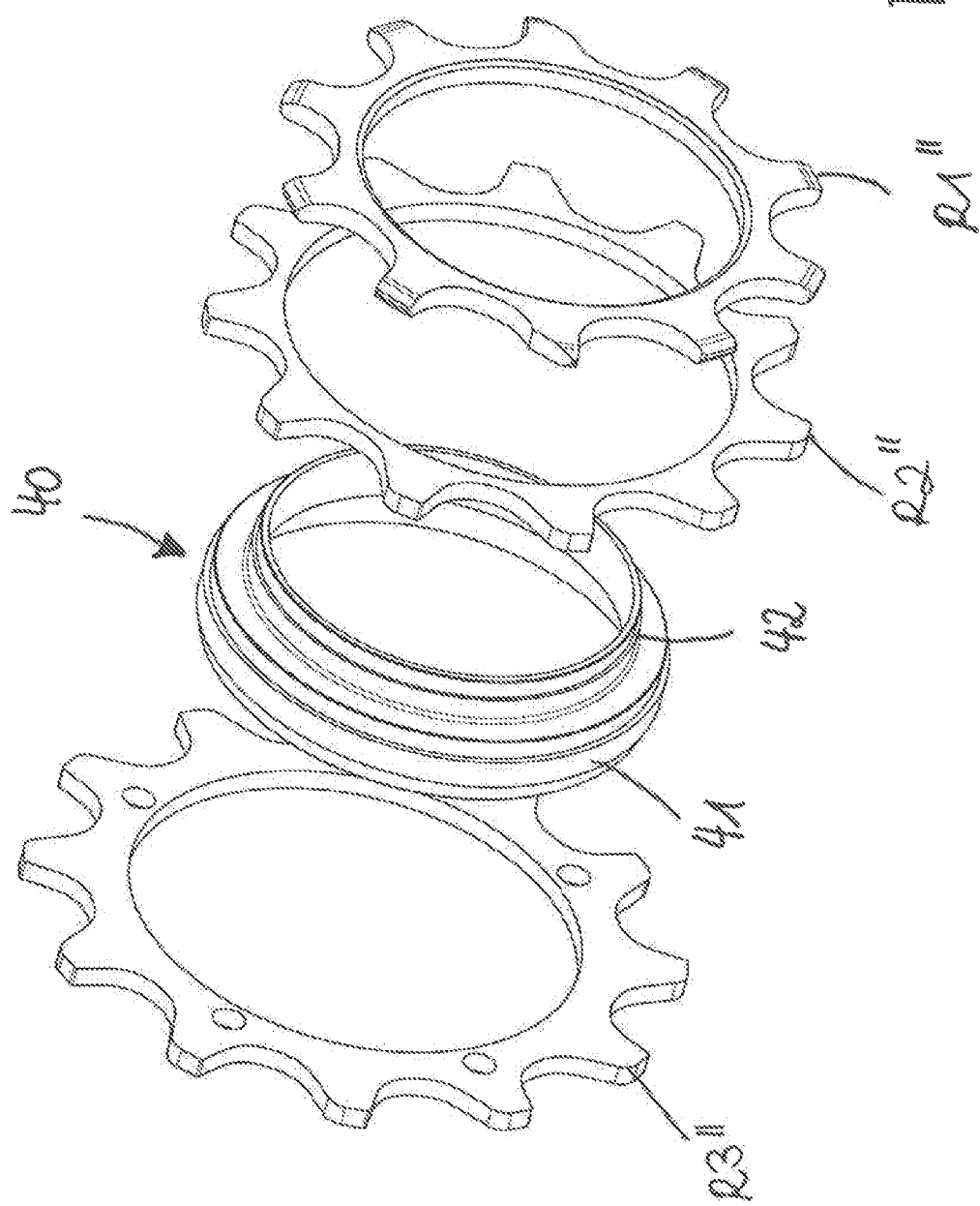
FIG. 13 shows an exploded view of the sprockets of FIG. 12.
Figure 14:
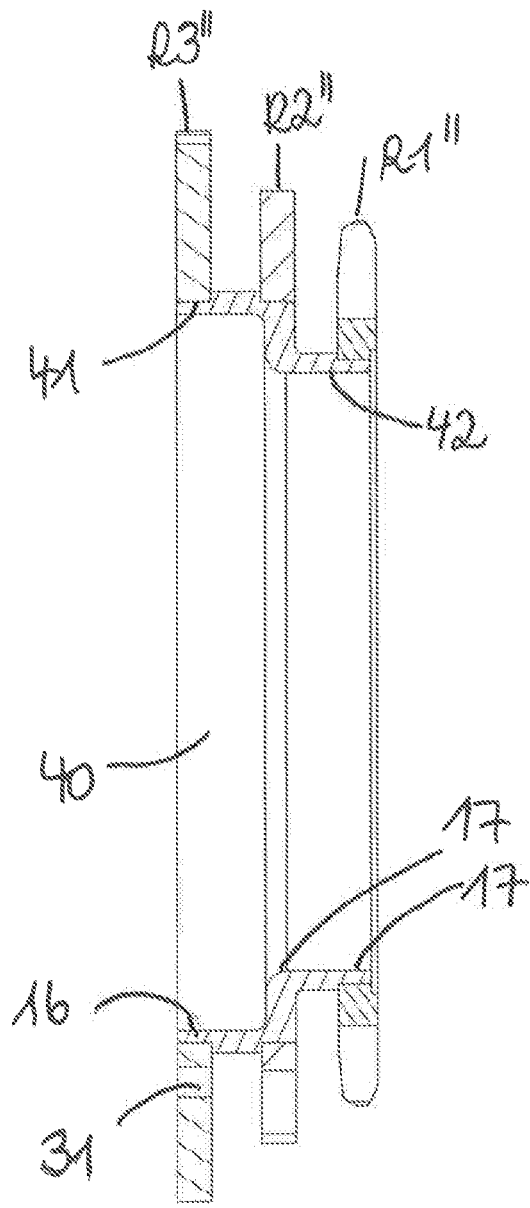
FIG. 14 shows a sectional view of the three smallest sprockets of FIG. 12.

FIGS. 9 to 11 show a second embodiment of the multi sprocket arrangement. The sectional depiction in FIG. 9 again shows only some of the sprockets R1 to R8 of the multi sprocket arrangement. These are mounted on the driver 50 using the adapter 60, as also shown in FIG. 3.

The second embodiment differs from the first in that the first sprocket R3' and the second sprocket R2' each have only one flange portion 21', 23' on the front side 11. The back sides of the sprockets R2' and R3' are flat and formed without flange portions. The first flange portion 21' of the first sprocket R3' extends axially in the direction of the next smaller sprocket R2' and butts against its flat back side 12. Sprockets R3' and R2' are connected in that the first flange portion 21' of the first sprocket R3' is welded to the back side 12 of the second sprocket R2'. Similarly, the third flange portion 23' extends axially in the direction of the next smaller sprocket R1' and butts against its flat back side 12. Sprockets R2' and R1' are welded together along the third flange portion 23'. For this, a laser beam L is oriented onto the respective connection point at an oblique angle of incidence, so that the sprockets to be connected are not damaged. In connected state, only the weld seams 20 are visible at the connecting points (see FIG. 11).

FIGS. 12 to 15 show a third embodiment of the multi sprocket arrangement. In contrast to the preceding embodiments, the sprockets here are connected together not directly but indirectly. For this, the three smallest sprockets R1" to R3" are pushed onto a tubular element 40 and connected thereto by welding. The tubular element 40 is formed so as to be stepped and comprises a first portion 41 of larger diameter and a second portion 42 of smaller diameter. The tubular element 40 together with the sprockets is pushed onto the adapter 60 (see FIGS. 3 and 5). The dimensions of the tubular element 40 depend on the dimensions of the adapter 60, which is also formed so as to be stepped.

The first sprocket R3" is welded to the element 40 in the region of the first portion 41. The inner diameter of the first portion 41 corresponds to the inner diameter 16 of the first sprocket R3". The second sprocket R2" is arranged in the transitional region between the first portion 41 and the second portion 42, so that the inner diameter of the second portion 42 corresponds to the inner diameter 17 of the second sprocket R2". The third sprocket R1" is arranged in the region of the second portion 42 and has the same inner diameter 17 as the second sprocket R2".

Figure 15:
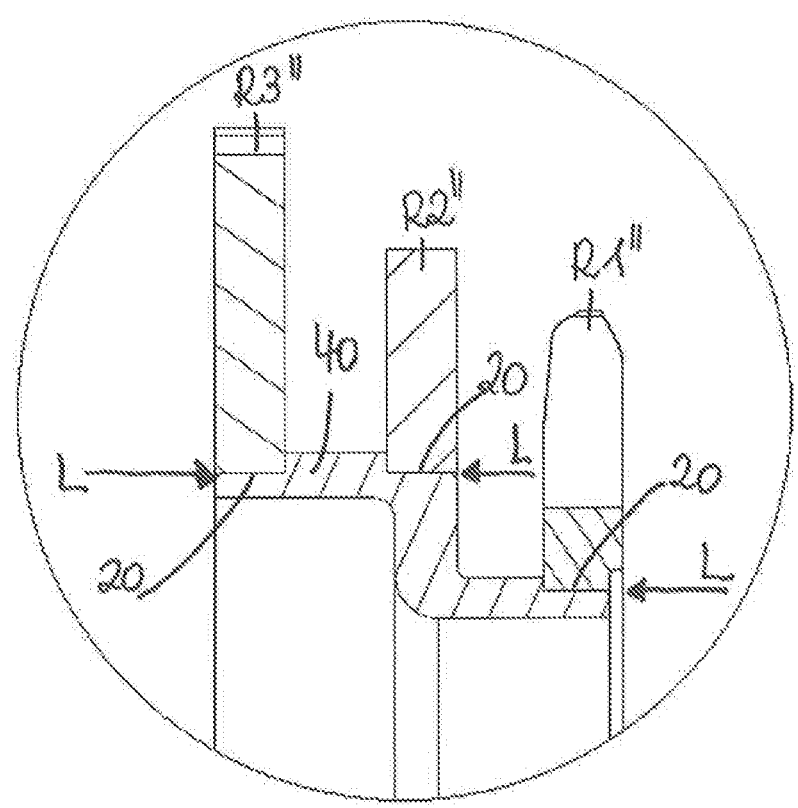
FIG. 15 shows a detail view of a portion of FIG. 14.

In this embodiment, again, the sprocket to be connected and the tubular element 40 are attached to a welding tool. The welding tool together with the sprockets to be connected is rotated about its own axis. The beam L of the laser welding device is oriented onto the surfaces to be joined at a right angle, and because of the rotation forms a circumferential weld seam 20. As FIG. 15 shows, the laser beam L is applied once from behind (for R3") and twice from the front (for R2" and R1") at a right angle. In order to be freely accessible to the laser, in this case first sprocket R2" and then sprocket R1" are welded on.

In principle, the laser intensity, rotational speed and welding duration may vary depending on the material properties. Either a continuous weld seam 20, or by spot welding an interrupted weld seam may be formed. As an alternative to laser welding, friction welding would also be conceivable. In principle, instead of welding, a solder connection would also be conceivable. Weld connections are however preferred because no additional solder material is required and hence very flat joints can be produced.

In the preceding exemplary embodiments, only the three smallest sprockets (R1 to R3) are welded together directly or indirectly. The other sprockets R4 to R12 are connected together by separate connecting mechanism 30 pressed into opening 31. Evidently, also fewer, more or all sprockets of the multi sprocket arrangement could be connected together by welding. It would also be conceivable to select an other known connecting mechanism than the retaining pins 30. The retaining pins 30 are also indicated merely as examples and not completely in some figures.

For further clarification, FIGS. 16 to 20 illustrate a fourth exemplary embodiment of the multi sprocket arrangement. This differs from the previous ones in that only two of the adjacent sprockets R, namely the first sprocket R3 and the second sprocket R2''' are welded together. The remaining sprockets R are connected by retaining pins 30.

Figure 16:
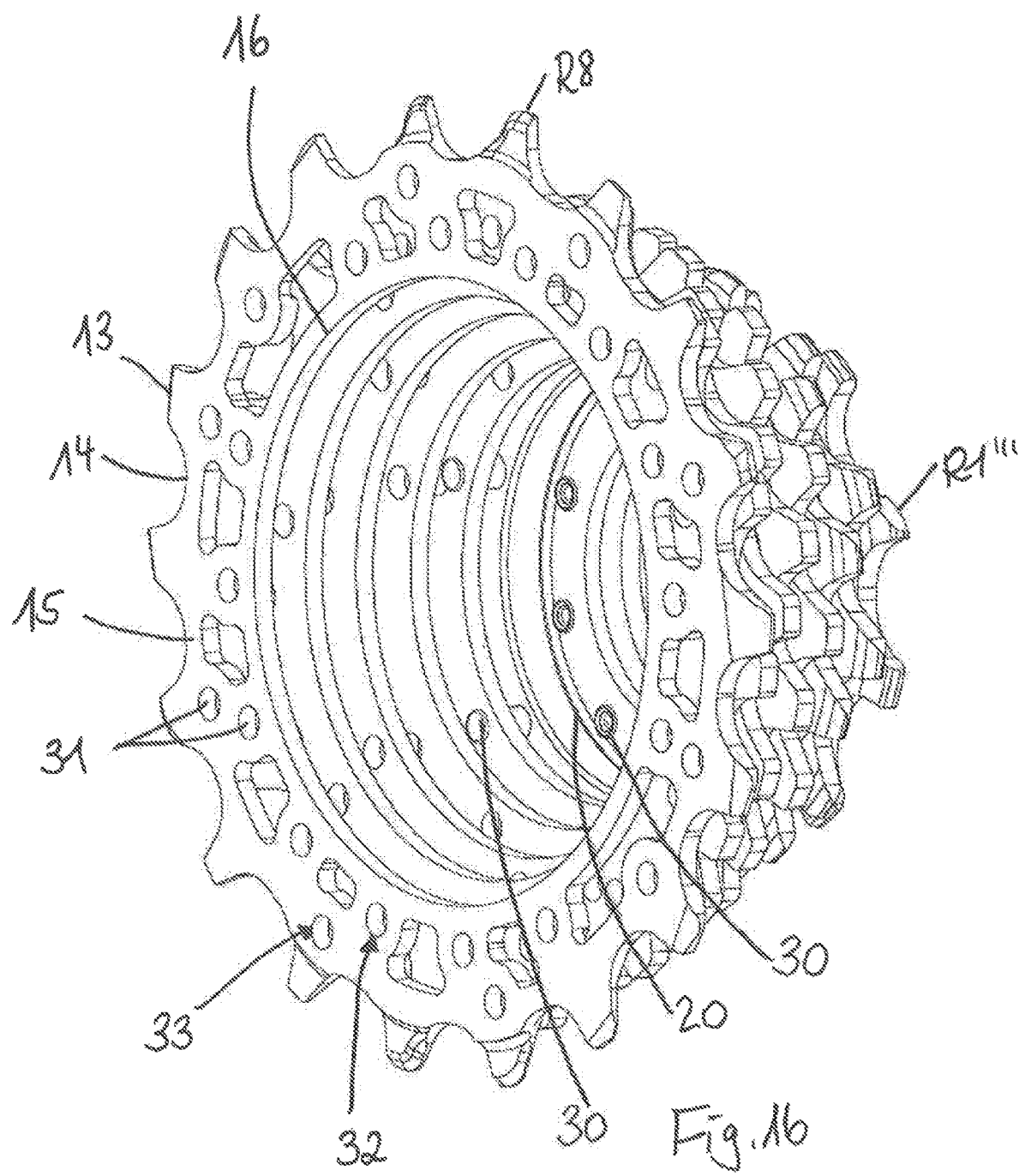
FIG. 16 shows a rear perspective view of a fourth embodiment.
Figure 17:
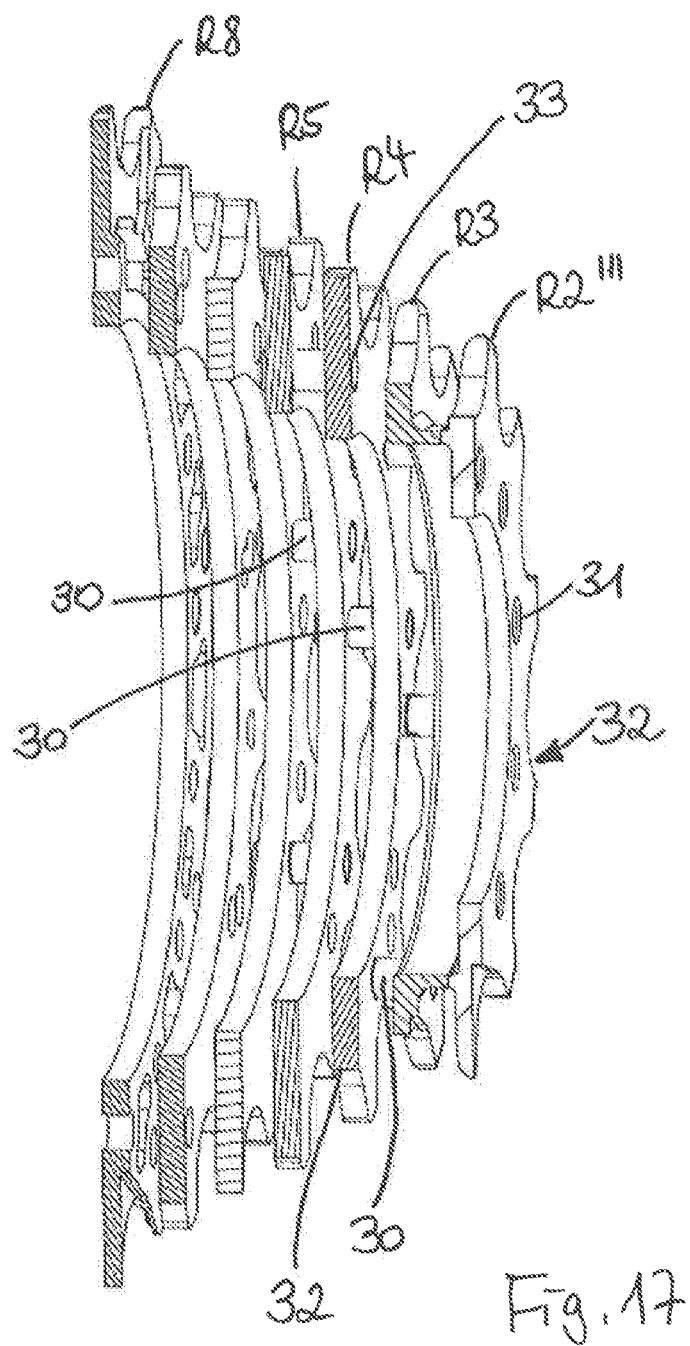
FIG. 17 shows a front perspective view of the fourth embodiment without small sprocket.
Figure 18:
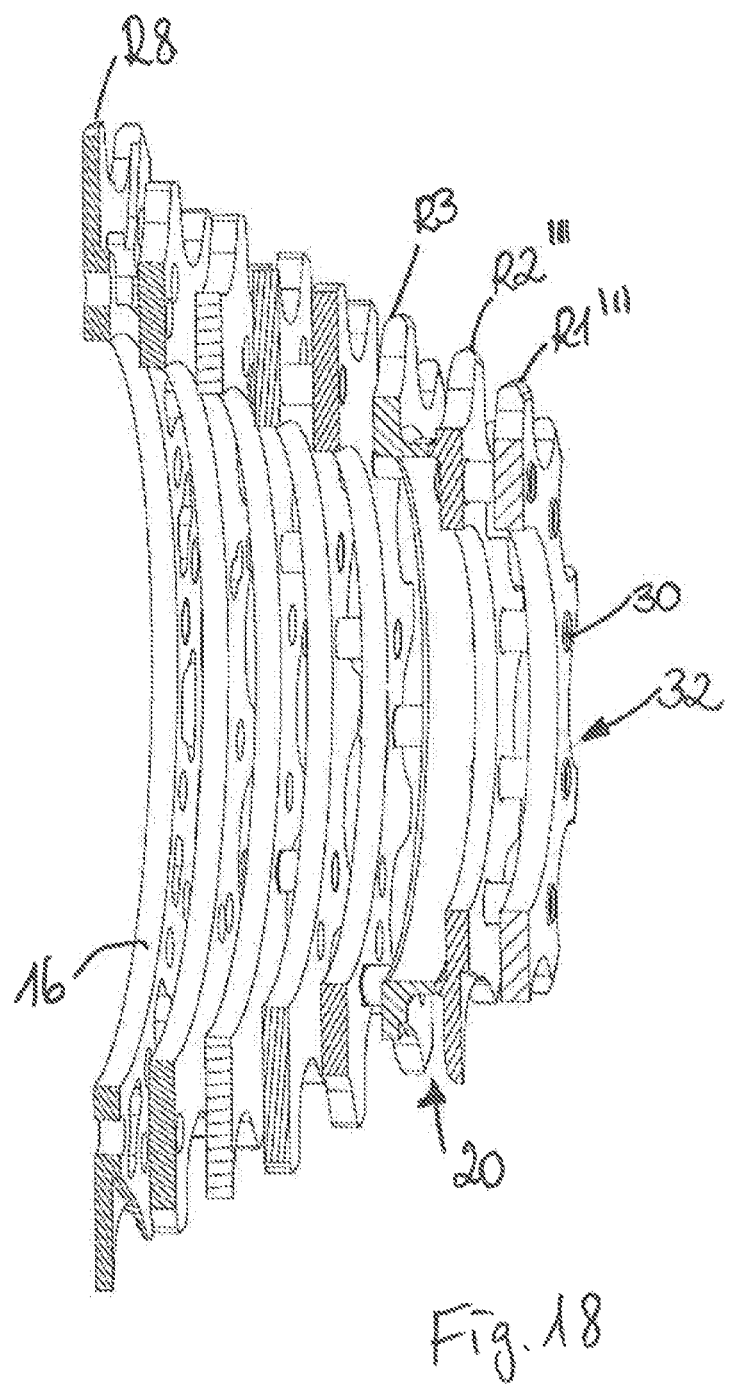
FIG. 18 shows a front perspective view of the fourth embodiment.
Figure 19:
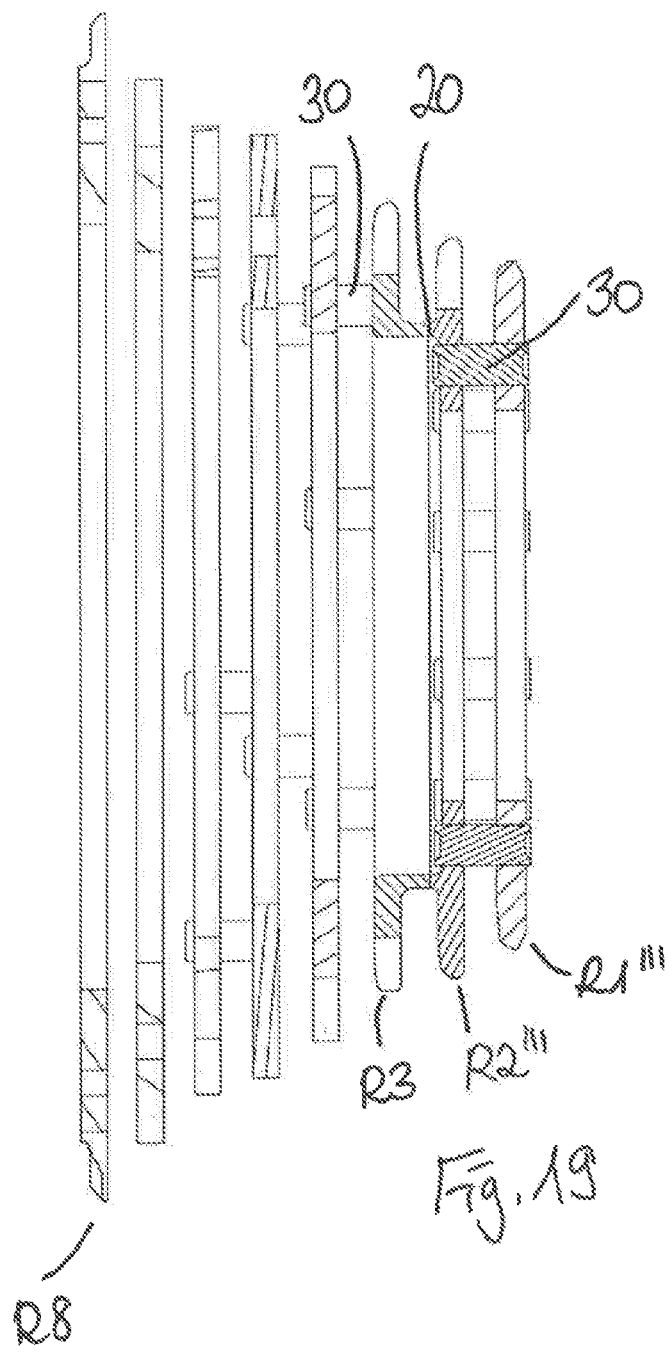
FIG. 19 shows a sectional view of the fourth embodiment.
Figure 20:
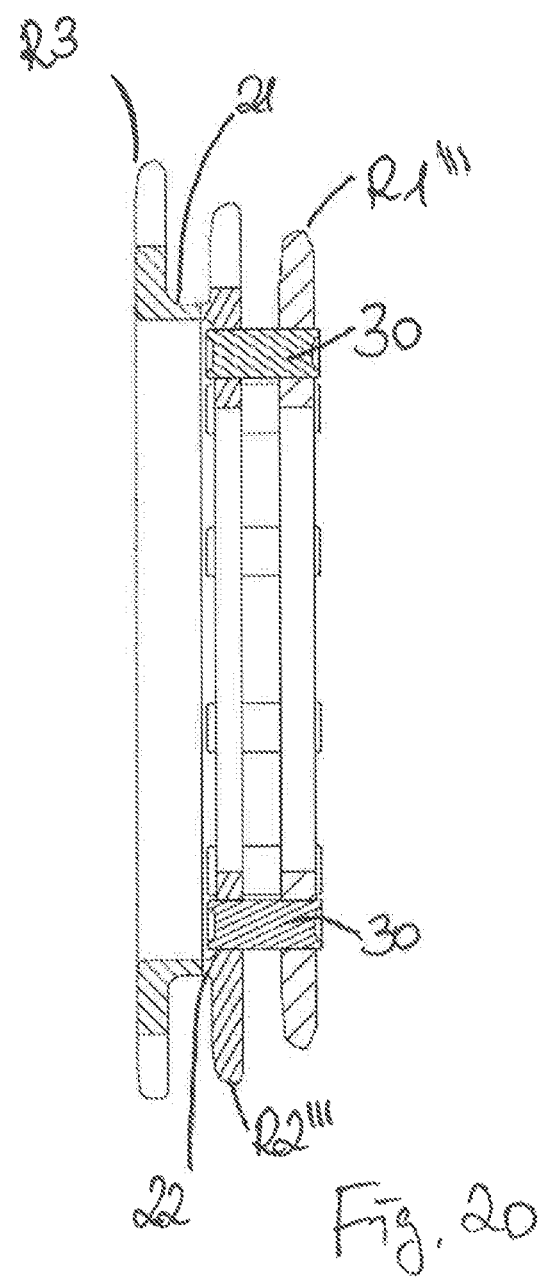
FIG. 20 shows an enlarged partial view of FIG. 19.

For better understanding, the smallest sprocket is not shown in FIG. 17, merely sprockets R2''' to R8. In FIGS. 16, 18 and 19 however, sprockets R1''' to R8 are shown. FIG. 20 shows an enlarged depiction of the three smallest sprockets R1''' to R3.

The first sprocket R3, as in the first embodiment, has a first flange portion 21 which extends in the direction of the adjacent, next smaller sprocket R2'''. The second sprocket R2''' has a second flange portion 22 which extends in the direction of the adjacent, next larger sprocket R3. The two flange portions 21, 22 point towards each other and have equal-sized diameters. The two sprockets R3 and R2''' are welded along their flange portions 21, 22. In contrast to the first exemplary embodiment, the front side of sprocket R2''' is free from flange portions. The second sprocket R2''' instead comprises a plurality of opening 31 which are arranged evenly distributed around a hole ring 32. Also, the adjacent smallest sprocket R1''' has a corresponding plurality of openings 31 which are also arranged around a hole ring of the same size. The two sprockets R1''' and R2''' are connected by a plurality of retaining pins 30. Each retaining pin 30 is pressed into two mutually aligned openings 31 in the adjacent sprockets R1''' and R2'''. Such a connection by separate mechanism 30 is possible on the smallest sprocket R1''' because only one hole ring is required for the one adjacent, second smallest sprocket R2'''. Both sprocket R1''' and sprocket R2''' offer sufficient space in the radial direction for one hole ring 32.

However, the second sprocket R2''' does not offer sufficient space for a second outer hole ring in order also to connect the next larger first sprocket R3 by retaining pins. This critical transition from sprocket R2 to sprocket R3 is achieved by a weld seam.

The larger sprockets R4 to R12 offer more space in the radial direction between the sprocket inner diameter 16 and the root circle diameter 15 (radially just inside the tooth base 14). The space is sufficient to arrange one inner hole ring 32 and one outer hole ring 33 on each sprocket. The larger sprockets can easily be connected by retaining pins 30. For example, the inner hole ring 32 of the fourth sprocket R4 is connected via pins 30 to the hole ring of the adjacent smaller sprocket R3, and the outer hole ring 33 of the fourth sprocket R4 is connected via pins 30 to the inner hole ring of the adjacent larger sprocket R5 (see FIG. 17).

The press fit creates a friction-fit and form-fit connection between the retaining pins 30 and the adjacent sprockets. No additional spacers or similar are required. In order to make the connection particularly stable, the retaining pins 30 may also be deformed at their ends, in particular riveted. This is advantageous in particular on the smallest sprocket. FIG. 16 shows both the riveted retaining pins 30 between the two smallest sprockets R1, R2 and also the non-riveted retaining pins 30 between sprockets R3 and R4. The weld seam 20 between sprockets R3 and R2 is also evident.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multi sprocket arrangement for mounting on a driver of a bicycle wheel, comprising:
    a plurality of adjacent sprockets, each of the plurality of adjacent sprockets having a different number of teeth, the plurality of adjacent sprockets comprising:
        a first sprocket having a first inner diameter which is larger than an outer diameter of a profile base of a carrier profile of the driver,
        a second sprocket having a second inner diameter which is smaller than the outer diameter of the profile base of the carrier profile of the driver, the second sprocket having a flat side facing the first sprocket, the second sprocket disposed axially outboard of the driver, an outer diameter of the second sprocket being smaller than an outer diameter of the first sprocket, and
        a third sprocket having a third inner diameter which is smaller than the outer diameter of the profile base of the carrier profile of the driver, the third sprocket having a flat side facing the second sprocket, the third sprocket disposed axially outboard of the second sprocket, an outer diameter of the third sprocket being smaller than the outer diameter of the second sprocket,
    the first sprocket having a first flange portion extending in a circumferential direction a distance corresponding to at least two teeth, the first flange portion extending parallel to a rear wheel axis to form an L-shaped cross section with the first sprocket and having a first free end at an end of the L-shaped cross section facing and abutting against the flat side of the second sprocket, the first sprocket welded to the second sprocket along the first free end of the first flange portion,
    the second sprocket having a third flange portion extending in the circumferential direction a distance corresponding to at least two teeth, the third flange portion extending parallel to the rear wheel axis to form an L-shaped cross section with the second sprocket and having a third free end at an end of the L-shaped cross section facing and abutting against the flat side of the third sprocket, the second sprocket welded to the third sprocket along the third free end of the third flange portion.

2. The multi sprocket arrangement according to claim 1, wherein the first flange portion has a diameter which is smaller than a root circle diameter of the first sprocket.

3. The multi sprocket arrangement according to claim 1, wherein at least one sprocket of the multi sprocket arrangement has an inner profile configured to engage the carrier profile of the driver.

4. The multi sprocket arrangement according to claim 1, wherein the first flange portion extends continuously in the circumferential direction around an entire circumference of the first sprocket.

5. The multi sprocket arrangement according to claim 1, wherein the number of teeth of first sprocket and the number of teeth of second sprocket differ by one tooth and the number of teeth of the second sprocket and the number of teeth of third sprocket differ by one tooth.

6. A bicycle drive comprising:
a bicycle chain;
a multi sprocket arrangement for mounting on a driver of a bicycle wheel, comprising:
a plurality of adjacent sprockets, each of the plurality of adjacent sprockets configured to interact with the bicycle chain and having a different number of teeth, the plurality of adjacent sprockets comprising:
a first sprocket having a first inner diameter which is larger than an outer diameter of a profile base of a carrier profile of the driver,
a second sprocket having a second inner diameter which is smaller than the outer diameter of the profile base of the carrier profile of the driver, the second sprocket having a flat side facing the first sprocket, the second sprocket disposed axially outboard of the driver, an outer diameter of the second sprocket being smaller than an outer diameter of the first sprocket, and
a third sprocket having a third inner diameter which is smaller than the outer diameter of the profile base of the carrier profile of the driver, the third sprocket having a flat side facing the second sprocket, the third sprocket disposed axially outboard of the second sprocket, an outer diameter of the third sprocket being smaller than the outer diameter of the second sprocket,
the first sprocket having a first flange portion extending in a circumferential direction a distance corresponding to at least two teeth, the first flange portion extending parallel to a rear wheel axis to form an L-shaped cross section with the first sprocket and having a first free end at an end of the L-shaped cross section facing and abutting against the flat side of the second sprocket, the first sprocket welded to the second sprocket along the first free end of the first flange portion,
the second sprocket having a third flange portion extending in the circumferential direction a distance corresponding to at least two teeth, the third flange portion extending parallel to the rear wheel axis to form an L-shaped cross section with the second sprocket and having a third free end at an end of the L-shaped cross section facing and abutting against the flat side of the third sprocket, the second sprocket welded to the third sprocket along the third free end of the third flange portion; and
a chain sprocket arrangement with at least one chain sprocket configured to interact with the bicycle chain.

* * * * *